United States Patent
Krantz et al.

(10) Patent No.: US 6,530,000 B1
(45) Date of Patent: Mar. 4, 2003

(54) METHODS AND SYSTEMS FOR ARBITRATING ACCESS TO A DISK CONTROLLER BUFFER MEMORY BY ALLOCATING VARIOUS AMOUNTS OF TIMES TO DIFFERENT ACCESSING UNITS

(75) Inventors: Leon A. Krantz, Mission Viejo, CA (US); Frank W. Campbell, Long Beach, CA (US)

(73) Assignee: Qlogic Corporation, Aliso Viejo, CA (US)

(*) Notice: Subject to any disclaimer, the term of this patent is extended or adjusted under 35 U.S.C. 154(b) by 0 days.

(21) Appl. No.: 09/275,629

(22) Filed: Mar. 24, 1999

(51) Int. Cl.⁷ .................. G06F 13/18; G06F 13/372
(52) U.S. Cl. .................. 711/151; 711/112; 711/147; 711/158; 711/167; 710/40; 710/45; 710/52
(58) Field of Search .................. 711/112, 147, 711/151, 157, 158, 167; 710/6, 40, 45, 52, 111, 117, 124

(56) References Cited

U.S. PATENT DOCUMENTS

| | | | |
|---|---|---|---|
| 4,000,485 A | 12/1976 | Barlow et al. | 710/200 |
| 4,558,429 A | 12/1985 | Barlow et al. | 711/157 |
| 5,072,420 A | 12/1991 | Conley et al. | 710/57 |
| 5,193,197 A | 3/1993 | Thacker | 710/123 |
| 5,249,271 A | 9/1993 | Hopkinson et al. | 710/57 |
| 5,276,662 A * | 1/1994 | Shaver, Jr. et al. | 369/32 |
| 5,276,807 A | 1/1994 | Kodama et al. | 710/305 |
| 5,301,333 A | 4/1994 | Lee | 710/244 |
| 5,339,443 A | 8/1994 | Lockwood | 710/244 |
| 5,408,644 A | 4/1995 | Schneider et al. | 714/1 |
| 5,465,343 A * | 11/1995 | Henson et al. | 711/112 |
| 5,487,170 A | 1/1996 | Bass et al. | 710/244 |
| 5,506,989 A | 4/1996 | Boldt et al. | 710/244 |
| 5,507,005 A | 4/1996 | Kojima et al. | 710/52 |
| 5,519,837 A | 5/1996 | Tran | 710/111 |
| 5,544,346 A | 8/1996 | Amini et al. | 711/154 |
| 5,546,545 A | 8/1996 | Rich | 710/111 |
| 5,546,548 A | 8/1996 | Chen et al. | 710/116 |
| 5,574,867 A | 11/1996 | Khaira | 710/113 |
| 5,583,999 A | 12/1996 | Sato et al. | 710/100 |
| 5,623,672 A | 4/1997 | Popat | 710/240 |
| 5,664,121 A | 9/1997 | Cerauskis | 710/113 |
| 5,689,656 A | 11/1997 | Baden et al. | 710/116 |
| 5,692,135 A | 11/1997 | Alvarez, II et al. | 710/107 |
| 5,740,466 A | 4/1998 | Geldman et al. | 710/5 |
| 5,784,569 A | 7/1998 | Miller et al. | 709/235 |
| 5,794,073 A | 8/1998 | Ramakrishnan et al. | 710/40 |
| 6,178,486 B1 * | 1/2001 | Gill et al. | 711/151 |

FOREIGN PATENT DOCUMENTS

EP    0 622 726 A2    11/1994

OTHER PUBLICATIONS

P.M. Bland, et al., Shared Storage Bus Circuitry, *IBM Technical Disclosure Bulletin*, vol. 25, No. 4, Sep. 1982, pp. 2223–2224.

Copy of PCT International Search Report for International Application No. PCT/US00/07780, mailed on Aug. 2, 2000.

* cited by examiner

*Primary Examiner*—Glenn Gossage
(74) *Attorney, Agent, or Firm*—TJ Singh & Klein, O'Neill & Singh

(57) ABSTRACT

A method and system for arbitrating access to a shared disk controller resource, including a buffer memory of a hard disk controller (HDC). An access cycle with a first cycle duration are disclosed and a first amount of time is allocated to a first accessing unit including an error correction code (ECC) engine, a microprocessor first-in-first-out (FIFO) unit, or a memory refresh/data format data fetch unit. The shared controller resource is accessed using the first accessing unit for a first duration, where the first duration is no greater than the first amount of time. A second amount of time and an unused portion of the first amount of time is allocated to a second accessing unit such as a disk formatter. Arbitration limit registers may be used to specify the number of HDC clock cycles per access cycle available to an accessing unit during which it can access the buffer memory. A global arbitration limit counter may be used to keep track of the duration of the accessing units.

34 Claims, 12 Drawing Sheets

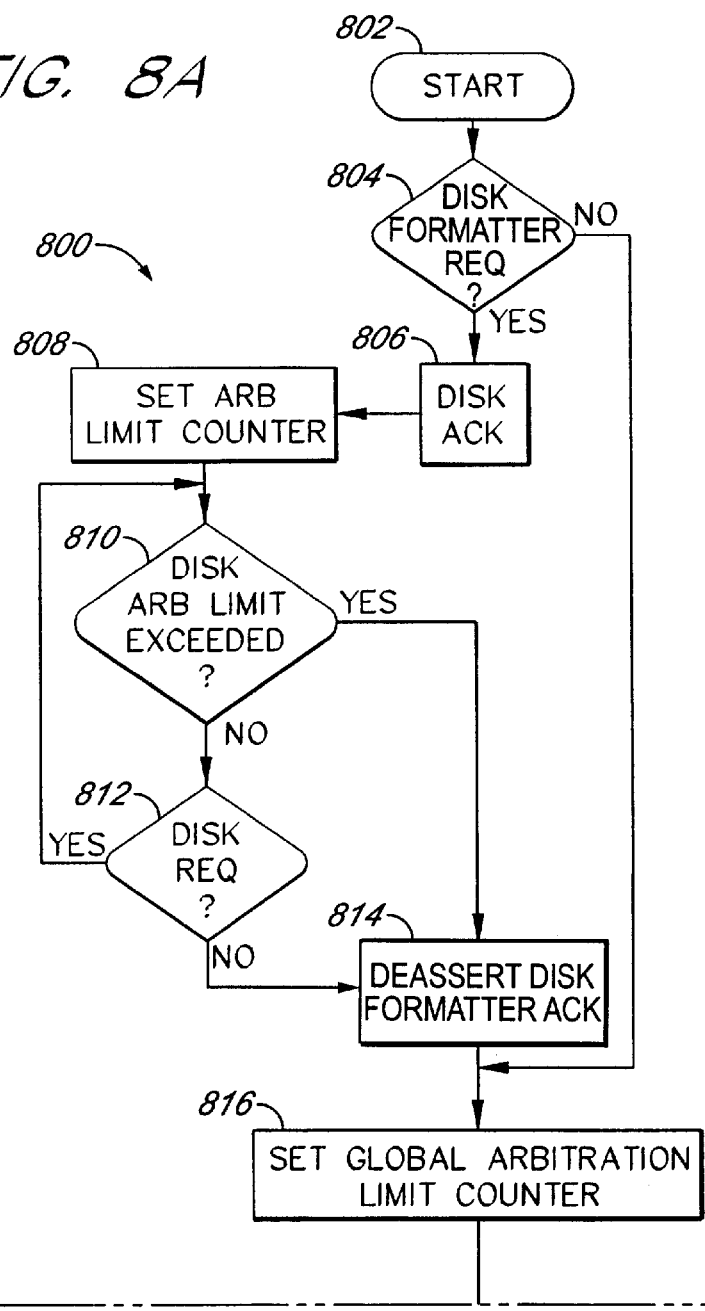

METHODS AND SYSTEMS FOR ARBITRATING ACCESS TO A DISK CONTROLLER BUFFER MEMORY BY ALLOCATING VARIOUS AMOUNTS OF TIMES TO DIFFERENT ACCESSING UNITS

BACKGROUND OF THE INVENTION

1. Field of the Invention

The present invention relates to mass data storage device controllers. More particularly, the invention relates to methods and systems for arbitrating access to a disk controller memory.

2. Description of the Related Art

Mass data storage is a critical component of computer systems. Typically, mass storage units consist of nonvolatile memory such as a hard disk, an optical drive or other type of storage device. Computer systems typically also contain volatile system memory, such as random access memory (RAM) circuits. Most personal computers today contain less than 256 megabytes of RAM while the same computers often contain hard disks with up to 10 gigabytes or more of capacity.

The mass storage unit of a computer is used to store programs and data on a nonvolatile basis. Thus, the mass storage device retains data even when the computer and the mass storage device are powered down. Volatile system memory, by contrast, serves as a temporary repository of program code and data. Typically, volatile system memory can be accessed much more quickly than a mass storage device. When a microprocessor requires access to programs or data that are not in system memory, the microprocessor first copies the data from the larger, but slower mass storage device to the system memory. The processor may then quickly access the data from the system memory. Further, under certain conditions, if new or modified data is stored in system memory, the microprocessor writes the data to the mass storage device.

A mass storage unit typically consists of a hard disk and a hard disk controller (HDC). The controller operates the hard disk, formats data as it is written to the disk, checks data as it is read from the disk, communicates the data to and from a host system, and buffers the data so as to compensate for latency and difference in data transfer rates between the hard disk and the host computer system.

Typically, the HDC includes a buffer memory which may be used to buffer data between the disk and the host. Because several functional units, such as the disk, the host, and the local controller, need to interact with the buffer memory, access to the buffer memory must be coordinated in some manner. Thus, the HDC may utilize an access arbiter to negotiate access to the buffer memory among various devices requesting access. However, conventional systems typically utilize arbiters that inefficiently provide fixed amounts of access times to accessing units each access cycle. Thus, conventional systems fail to dynamically accommodate changing utilizations of the buffer memory by the accessing units.

SUMMARY OF THE INVENTION

The present invention is directed to a method and system for arbitrating access to a shared resource of a mass storage device controller. In one embodiment of the invention, the controller is a hard disk controller and the shared resource is a local buffer memory of the hard disk controller. Several units or circuits within the controller each access the buffer memory to store or retrieve information. These units may include a controller microprocessor, a host interface unit, a disk formatter unit, a buffer memory refresh unit, a disk format data fetch unit, and an error correction unit. In arbitrating access to the buffer memory, the various access requirements of the units are taken into account. For example, in one embodiment, the disk controller has the most time critical, predictable and periodic access requirements, the other units have less critical and less predictable access requirements, and the host interface unit has the least predictable and least time critical access requirements.

A system according to one embodiment of the present invention operates in a cycle during which each unit is offered continuous access duration. The disk formatter, having the most critical access requirements, is offered periodic access such that the time delay during which it does not have access does not exceed a specified period.

At the high level, the access cycle is bifurcated into two parts. A first part represents the time during which the disk formatter accesses the buffer memory. The second part of the access cycle represents the time during which the remaining units, that is, the units other than the disk formatter, access the buffer memory. However, while the remaining units access the buffer memory, the disk formatter cannot access the buffer memory. In one embodiment, to ensure that the disk formatter is guaranteed periodic access within a predetermined amount of time, the combined access time of the remaining units is limited to a predetermined amount. Similarly, in order to ensure that the remaining units receive access, the access time of the disk formatter is also limited to a predetermined amount. As each of the two parts of the access cycle has a maximum duration, the access cycle itself has a maximum allowed duration.

At the next level, the part of the access cycle allocated to the remaining units is again divided up. Each of the remaining units is allocated a maximum amount of time within the time allocated to the remaining, non-disk formatter units. If any of the remaining units do not use their maximum allocation, the unused time is offered to the last of the remaining units. If the last unit does not use all of the time available to it, the arbitration cycle terminates early. Thus, the time before which the disk formatter is again offered access to the buffer memory ends up being shorter than the specified maximum duration.

In one embodiment, during an access cycle, time is deducted from the total access time allocated to the remaining units as each of the remaining units sequentially utilizes a portion of the total allocated time. Whatever remains of the allocated time after all but the last unit has been offered access, is allocated to the last unit.

BRIEF DESCRIPTION OF THE DRAWINGS

Referring now to the drawings in which like reference numbers represent corresponding components throughout:

FIGS. 8 and 8A–8D illustrate a flow chart of one embodiment of an arbitration process.

DETAILED DESCRIPTION OF THE DRAWINGS

In the following description, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components and devices have not been described in detail so as not to unnecessarily obscure aspects of the present invention.

The detailed description which follows is organized into the following sections: Architectural Overview of One Embodiment of a System Appropriate for Use with One Embodiment of the Present Invention, Detailed Description of One Embodiment of the Arbitration Process, Exemplary Timing Scenarios, and Exemplary Arbitration Limit Calculations.

Figure 1:
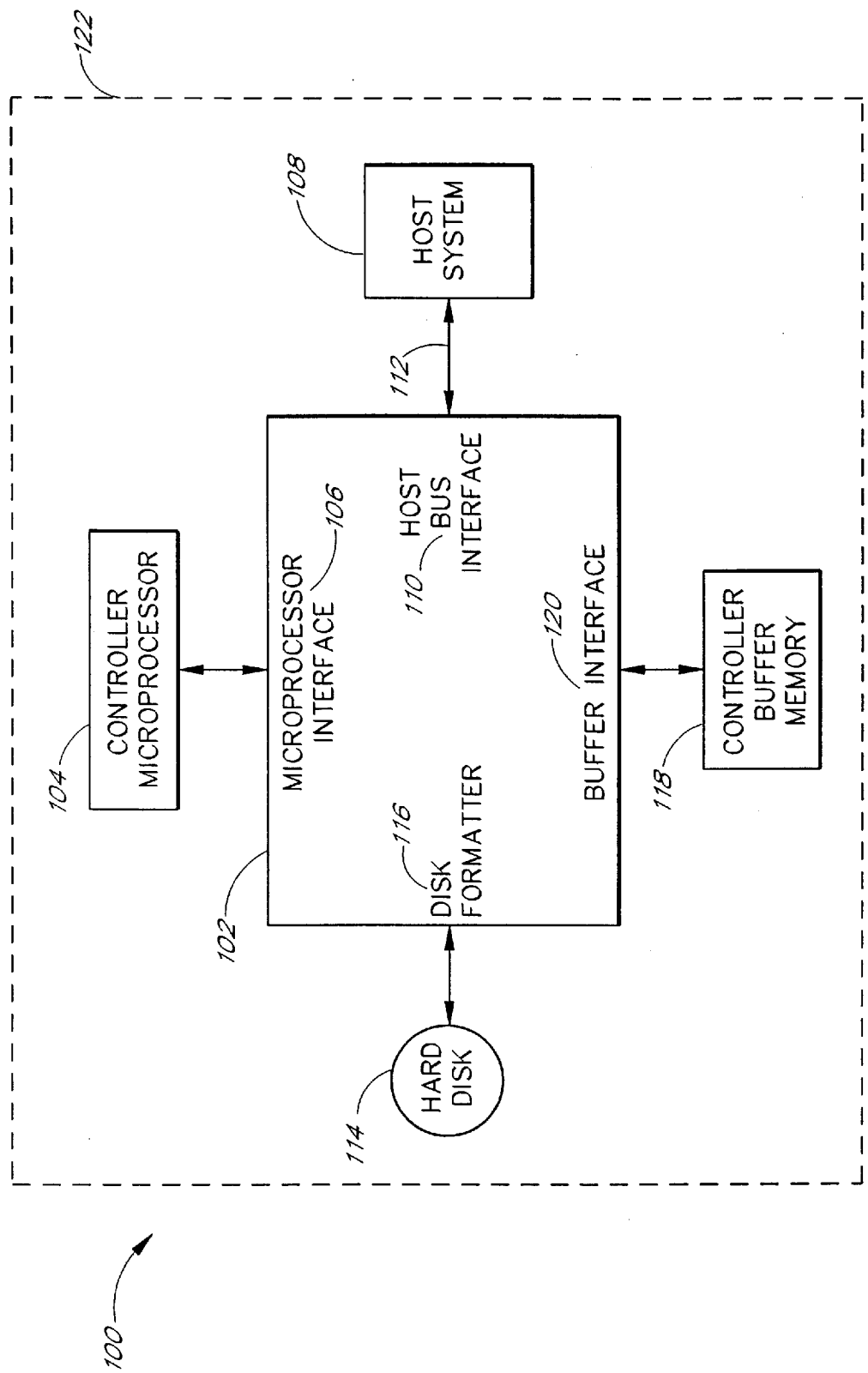
FIG. 1 illustrates a block diagram of one embodiment of a computer system adapted to implement one embodiment of the present invention.

Architectural Overview of One Embodiment of a System Appropriate for Use with One Embodiment of the Present Invention FIG. 1 illustrates a block diagram of one embodiment of a system 100 in which a hard disk controller (HDC) 122 is typically used. An HDC core 102 is connected via a host bus interface 110 to a host system 108 using a host system bus 112. The host system 108 may consist of one or more host system microprocessors, system RAM, a monitor, a keyboard, and other devices.

The host system 108 exchanges data to be stored on or retrieved from a hard disk 114 through the host system bus 112. Instructions from the host system 108 to the HDC core 102 regarding, for example, what data to retrieve or where to store data are also sent over the host system bus 112.

In addition, a controller microprocessor 104 is connected to the HDC core 102 through a microprocessor interface 106. The controller microprocessor 104, which, in one embodiment, is distinct from the host. system microprocessor, receives and executes instructions from the host system 108 and manages the HDC core 102. The hard disk 114 is connected to the HDC core 102 through a disk formatter 116. As discussed in greater detail below, the disk formatter 116 controls the operation of the hard disk 114. In the illustrated embodiment, the hard disk 114 consists of a magnetic disk device and associated circuitry. A controller buffer memory 118 is connected to the HDC core 102 through a buffer interface 120. In one embodiment, the buffer memory 118 is. configured using random access memory (RAM). The RAM may be dynamic or static.

Figure 2:
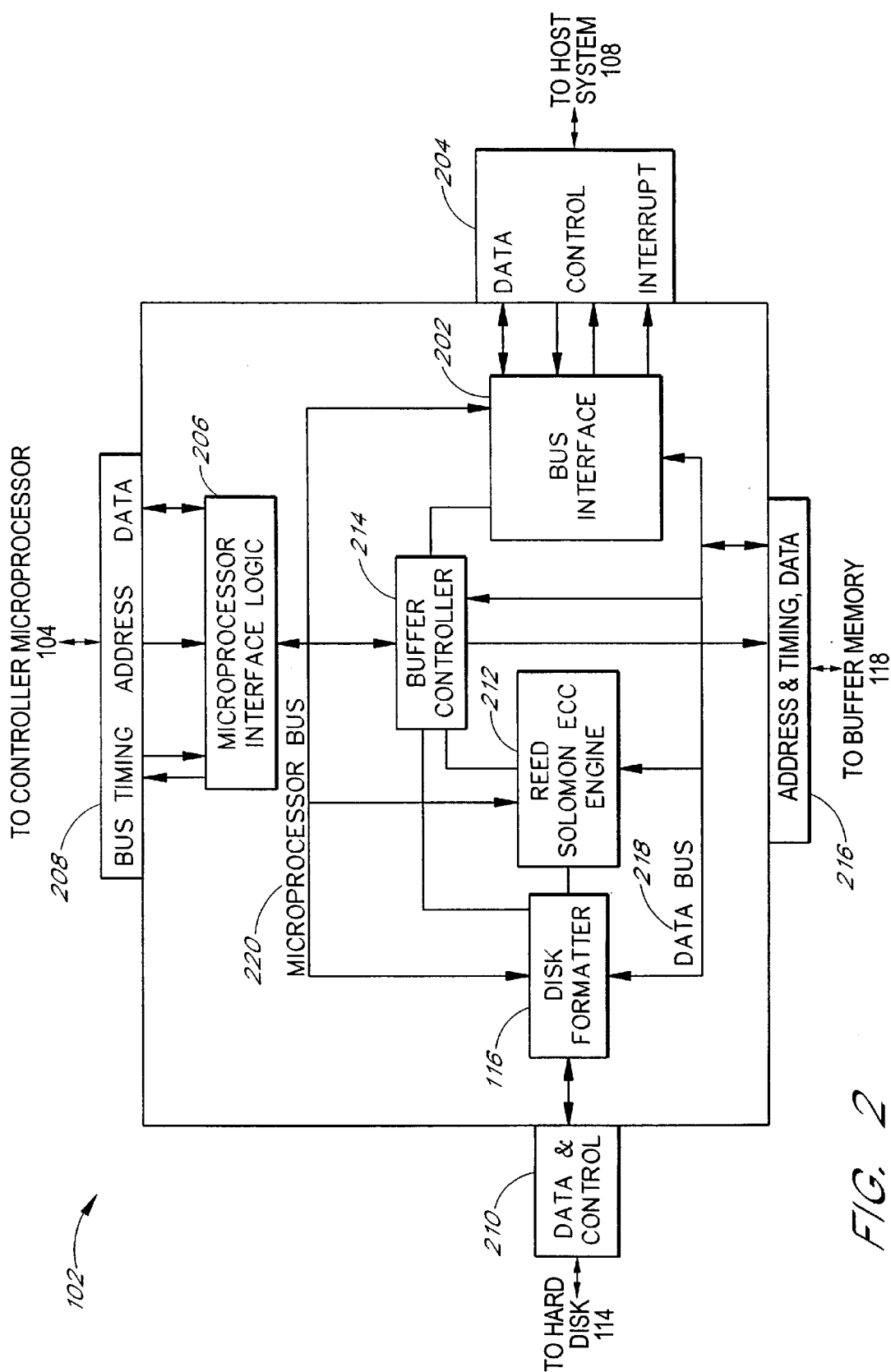
FIG. 2 illustrates one embodiment of a disk controller circuit.

FIG. 2 illustrates one embodiment of the HDC core 102 and associated ports 204, 208, 210, 216. The bus interface 202 sends and receives information from the host system 108 through data, control, and interrupt lines of the host bus port 204. The microprocessor interface logic 206 connects the controller microprocessor 104 to the HDC core 102 through timing, address, and data lines of the controller microprocessor port 208. The microprocessor bus 220 allows the controller microprocessor 104 to communicate with and control the various units in the HDC 102 core.

As, illustrated in FIG. 2, the disk formatter 116 is connected to the disk 114 through the data and control lines of the disk port 210. A Reed Solomon error correction code (ECC) engine 212 is connected to the disk formatter 116 via a bus. The ECC engine 212 performs error correction on disk reads, as well as error correction code generation on disk writes. A buffer controller 214 is connected to the buffer memory 118 through the address, timing, and data lines of the buffer port 216. In one embodiment, the buffer controller 214 includes an arbiter (not shown) which controls access to the buffer memory 118 by the disk formatter 116, the ECC engine 212, the host bus interface 202, and the microprocessor interface logic 206, in addition to other units discussed below. The arbiter is later discussed in greater detail. The various units that access the buffer memory 118 do so through the data bus 218. The data bus 218 is coupled to the buffer memory 118 via the buffer port 216.

Figure 3:
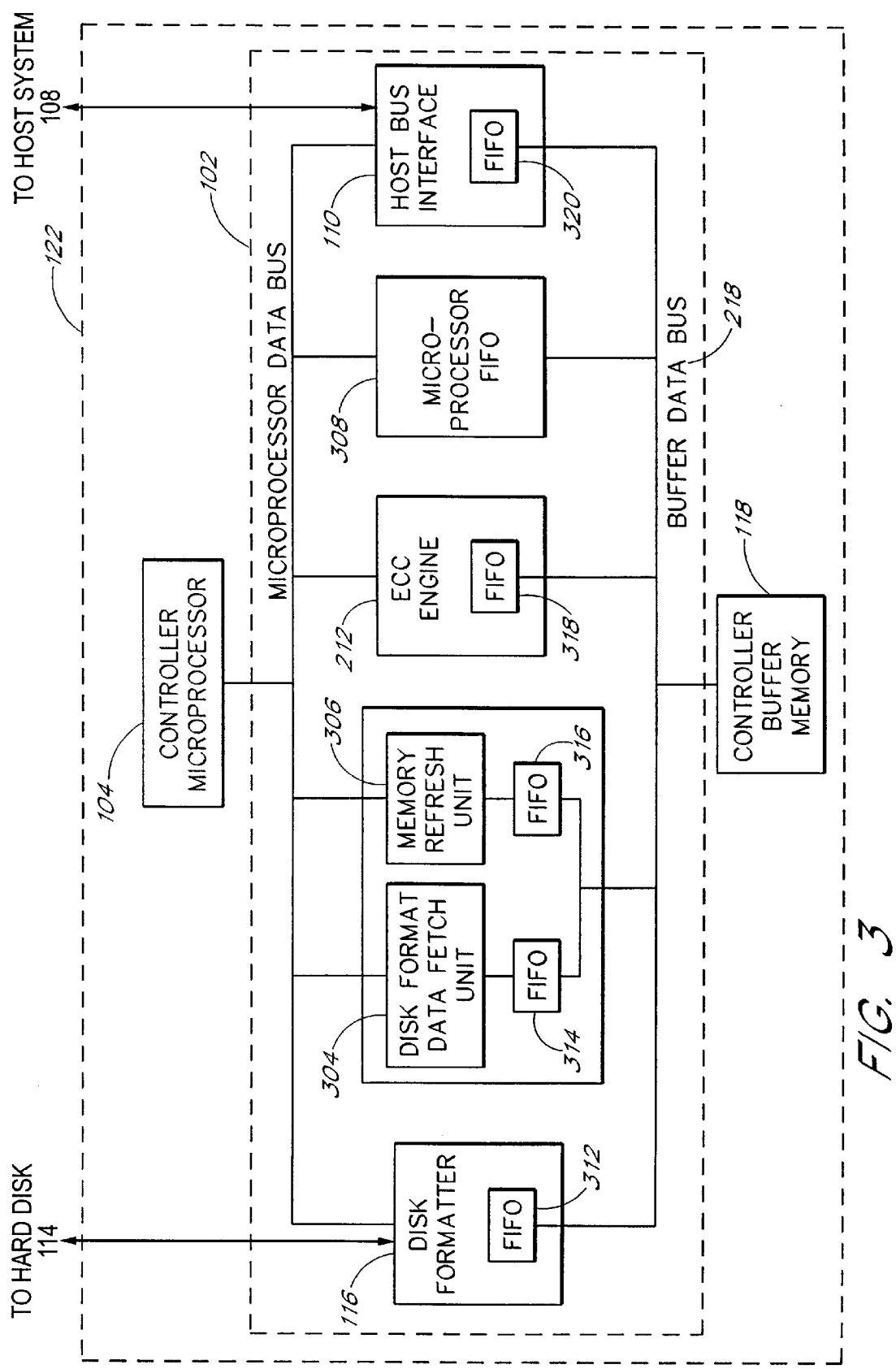
FIG. 3 illustrates one embodiment of the bus architecture of the disk controller.

FIG. 3 depicts one embodiment of the bus architecture of HDC 122. The units which access the buffer memory 118 do so through respective "first in first out" (FIFO) buffers 308, 312, 314, 316, 318 and 320. These FIFO buffers may vary in size. In one embodiment, the FIFO buffers each have between 64 to 96 bytes of storage. The controller microprocessor 104 accesses the buffer memory 118 through the microprocessor FIFO 308. The buffer memory 118 serves as the main memory, storing instructions and data, for the controller microprocessor 104.

A disk format data fetch unit 304 operates to fetch disk format data from the buffer memory 118. The disk formatter 116 uses this data to locate and organize host system data on the hard disk 114. The memory refresh unit 306 operates to refresh the buffer memory 118 at required intervals when the buffer memory uses dynamic RAM. As discussed below, in one embodiment, both the disk format data fetch unit 304 and the memory refresh unit 306 share one arbitration slot for the purposes of buffer memory access arbitration. Thus, only one of the disk format data fetch unit 304 and the memory refresh unit 306 may access the buffer memory 118 in a single access cycle. However, in another embodiment, the memory refresh unit 306 and disk format data fetch unit 304 may each have their own arbitration slot. The disk format data fetch unit 304 and the memory refresh unit 306 access the buffer memory 118 through their respective FIFO buffers 314 and 316.

As illustrated in FIG. 3, the ECC engine 212 is connected to the buffer memory 118 through a FIFO 318. The ECC engine FIFO 318 is used to correct data read from the hard disk 114 while the data is in the buffer memory 118. The buffer controller 214 (FIG. 2) effectuates the correction through a read/modify/write process.

The host bus interface 110 is connected to the buffer memory 118 through its FIFO 320. The host bus interface 110 channels data and instructions between the host system 108 and the buffer memory 118.

Figure 4:
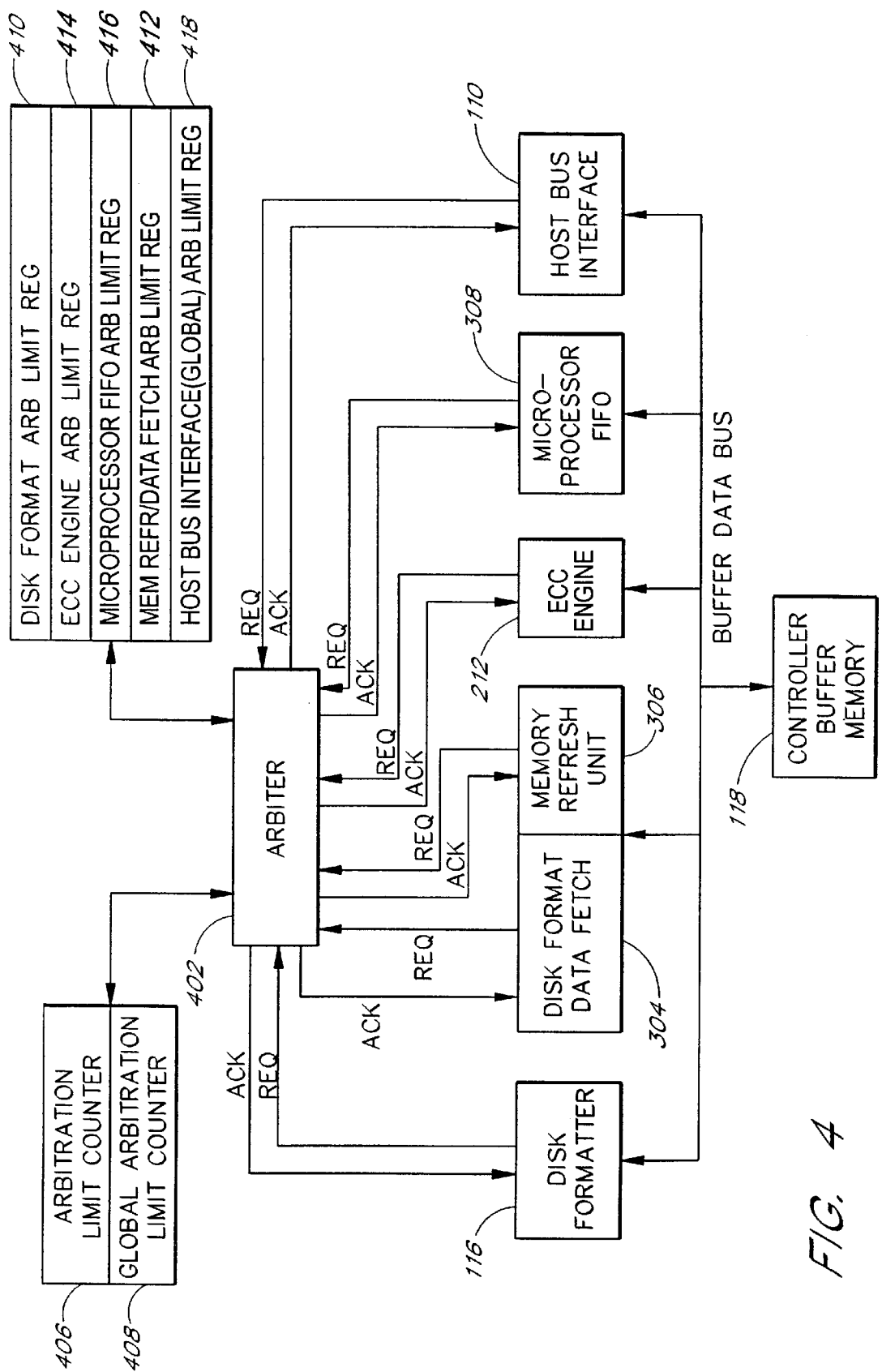
FIG. 4 illustrates one embodiment of the disk controller arbitration architecture.

FIG. 4 illustrates one embodiment of the connectivity between the disk formatter 116, the disk format data fetch unit 304, the memory refresh unit 306, the ECC engine 212, the microprocessor FIFO 308, the host bus interface 110 and an arbiter 402. The arbiter 402 arbitrates between the various units accessing the buffer memory. The arbiter 402 grants access to requesting units during a repeating access cycle. An access cycle is a period of time during which access is offered to each unit, or a group of units sharing an access slot, that access the buffer memory. In one embodiment, each unit has a request line, titled "REQ," for requesting access to the buffer memory 118, as well as an acknowledge line, titled "ACK," by way of which the arbiter 402 grants a requested access.

Connected to the arbiter 402 is a set of arbitration limit registers 410–418, which hold respective units' arbitration limits. In one embodiment a given arbitration limit is specified as the number of HDC clock cycles per access cycle available to a unit during which it can access the buffer memory 118. The arbitration limit registers include: the disk formatter arbitration limit register 410, the memory refresh unit and disk format data fetch register 412, the ECC engine arbitration limit register 414, the microprocessor FIFO arbitration limit register 416, and the host bus interface (global) arbitration limit register 418. Note that the disk format data fetch unit 306 and the memory refresh unit 306 share the same arbitration limit and use the same arbitration limit register 412. The host bus interface arbitration limit register 418 is also called the global arbitration limit register for reasons that will be discussed below. The arbitration limit registers 410–418 store time limits defined in HDC clock cycles for each unit's maximum specified access duration during an access cycle. In one embodiment, the access duration is for a continuous time period. As further described below, also connected to the arbiter 402 are an arbitration limit counter 406 and a global arbitration limit counter 408, used to keep track of the access durations of the units by loading and decrementing arbitration limit values. The global arbitration limit counter 408 tracks the available access time of the host bus interface and the arbitration limit counter 406 tracks the available access time for the remaining units.

Figure 5:
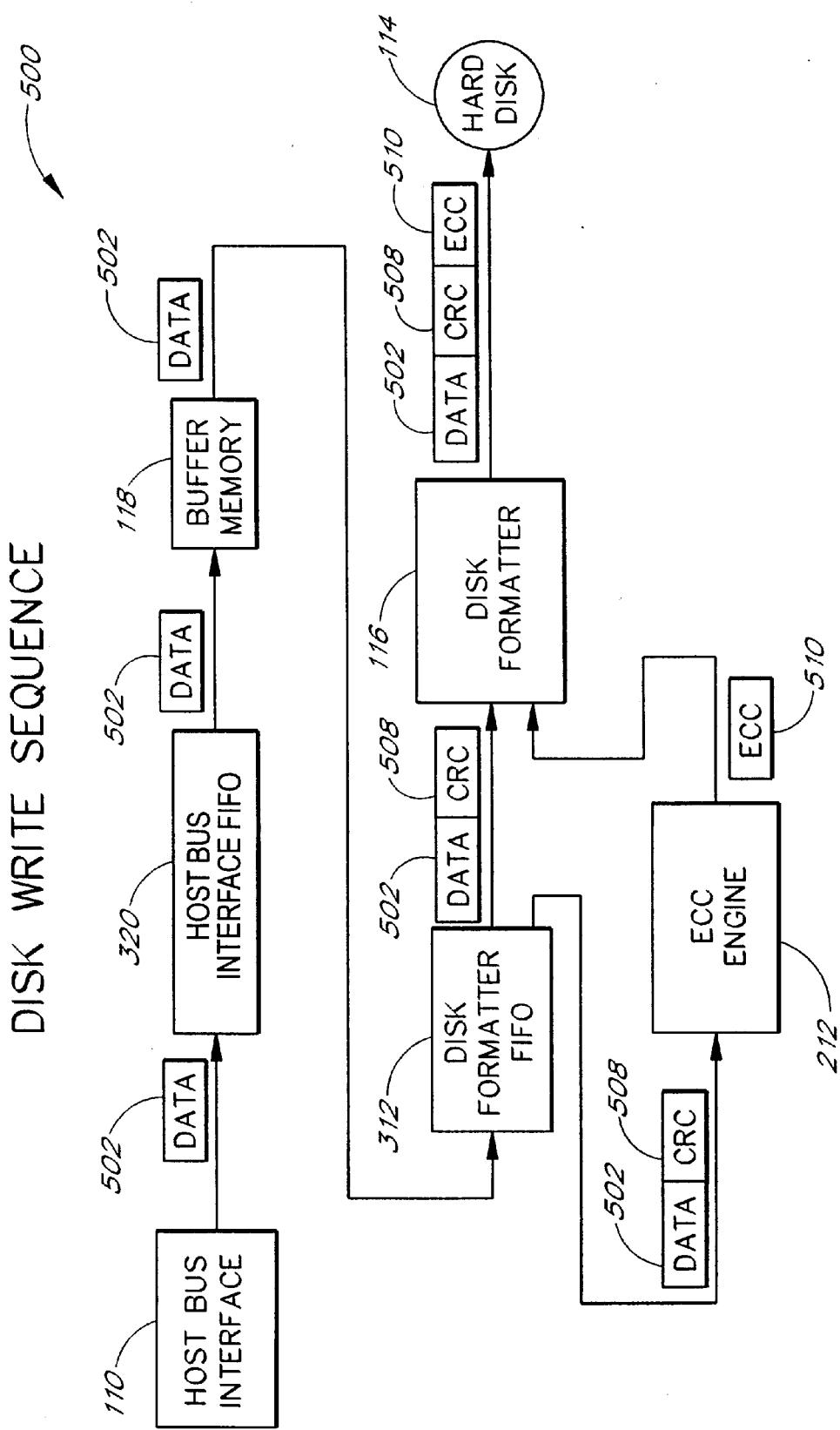
FIG. 5 illustrates one embodiment of a typical disk write sequence and data format.

FIG. 5 illustrates an exemplary disk write sequence 500 as the write data passes through various units of the HDC 102. Data 502 from the host system 108 arrives at the host bus interface 110 and is passed through the host bus interface FIFO 320 to the buffer memory 118. The FIFO 320 buffers the data 502 as needed while waiting for access to the buffer memory 118. In one embodiment, data is read from or stored on the disk 114 in units no smaller than a sector, which is typically 512 bytes. If a quantity of data less than a sector needs to be accessed, a whole sector is nevertheless accessed. After at least a complete sector of data is stored in the buffer memory 118, the data 502 is then directed to the disk formatter 116 via the disk formatter FIFO 312 along with a cyclic redundancy check (CRC) tag (CRC 508). The CRC is a code generated from the data that can be used to confirm the correctness of the data. The FIFO 312 buffers the data 502 as it arrives from the buffer memory 118. While the data 502 and CRC 508 are en route to the disk formatter 116, the data 502 and CRC 508 are also passed through the ECC engine 212, which generates an error correction code (ECC) 510. The ECC 510 is passed to the disk formatter 116 to be appended to the data 502 and the CRC 508, all of which is then written to the hard disk 114 by the disk formatter 116.

Figure 6:
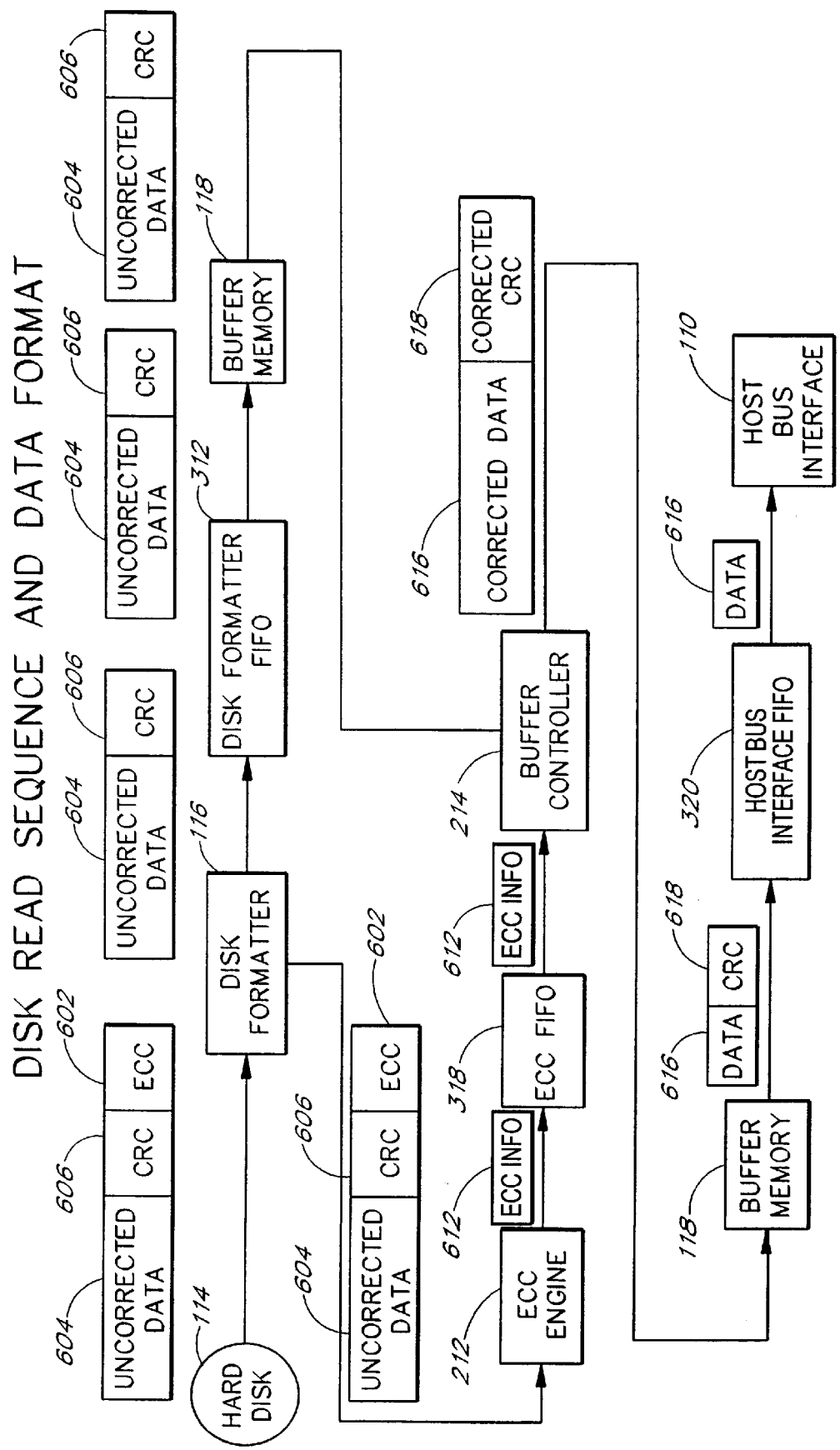
FIG. 6 illustrates one embodiment of a typical disk read sequence and data format.

FIG. 6 illustrates an exemplary disk read sequence as the data passes through the units of the HDC core 102. ECC techniques are used to compensate for the possibility that a sector's uncorrected data 604, CRC 606 and ECC 602 might become corrupted during the process of being written to and read from the hard disk 114. As described below, the ECC engine 212 performs the task of correcting the uncorrected data 604 and/or CRC 606 after it has been retrieved from the hard disk 114. As the uncorrected data 604, CRC 606 and ECC 602 are read from the hard disk 114, the disk air formatter 116 sends the uncorrected data 604, CRC 606 and ECC 602 to the ECC engine 212. The disk formatter 116 also strips off the ECC 602 and passes the uncorrected data 604 and CRC 606 to the disk formatter FIFO 312 and then on to the buffer memory 118. The disk formatter FIFO 312 absorbs any latency when waiting to access the buffer memory 118. While the uncorrected data 604 and CRC 606 are stored in the buffer memory 118, the ECC engine 212 executes an algorithm that creates error correction information 612 from the uncorrected data 604, CRC 606, and ECC 602. The ECC engine 212 passes this error correction information 612 on to the ECC FIFO 318. The buffer controller 214 then uses the error correction information 612 in the ECC FIFO 318 to attempt to correct any errors in the uncorrected data 604 and the CRC 606 residing in the buffer memory 118. The buffer controller 214 corrects the data 604 and the CRC 606 by reading the uncorrected data 604 and/or CRC 606 from the buffer memory 118, appropriately modifying the uncorrected data 604 and/or CRC 606 using the information 612 in the ECC FIFO 318 and then writing the corrected data 616 and/or CRC 618 back to the buffer memory 118. The corrected CRC data 616 and corrected CRC 618 are then passed to the host bus interface FIFO 320. The CRC 618 is then checked. The CRC check determines whether the data correction operation was successful. If the data 616 is correct, the data 616 is passed to the host bus interface 1 10 and on to the host system 108. If the data 616 is not correct, an error signal is generated and directed to the host system.

As discussed above, several units within the HDC core 102 access the buffer memory 118 during either a typical read or write of disk data. In addition to the accesses described during the read and write sequences, the controller microprocessor 104 also accesses the buffer memory 118 since the buffer memory serves as the microprocessor's main memory. Furthermore, upon performing a disk write or read, the disk formatter 116 utilizes disk format information retrieved by the disk format data fetch unit 304 and stored in the buffer memory 118. The buffer memory's dynamic RAM 118 also needs to be refreshed periodically and thus the buffer memory refresh unit 306 accesses the buffer memory as well.

DETAILED DESCRIPTION OF ONE EMBODIMENT OF THE ARBITRATION PROCESS

The arbitration method and apparatus of one embodiment of the present invention ensure periodic access by all units requesting access and dynamically provides for an efficient allocation of available access time among units. The arbiter 402 (FIG. 402) functions with settable arbitration limits. In one embodiment, the arbitration limits correspond to the numbers of clock cycles representing the maximum access time for a corresponding unit. The limits may be programmed in non-volatile read only memory such as ROM or electrically erasable programmable read only memory (EEPROM). Alternatively, the arbitration limits may be determined and set on the fly by the host system or the controller microprocessor.

Figure 7:
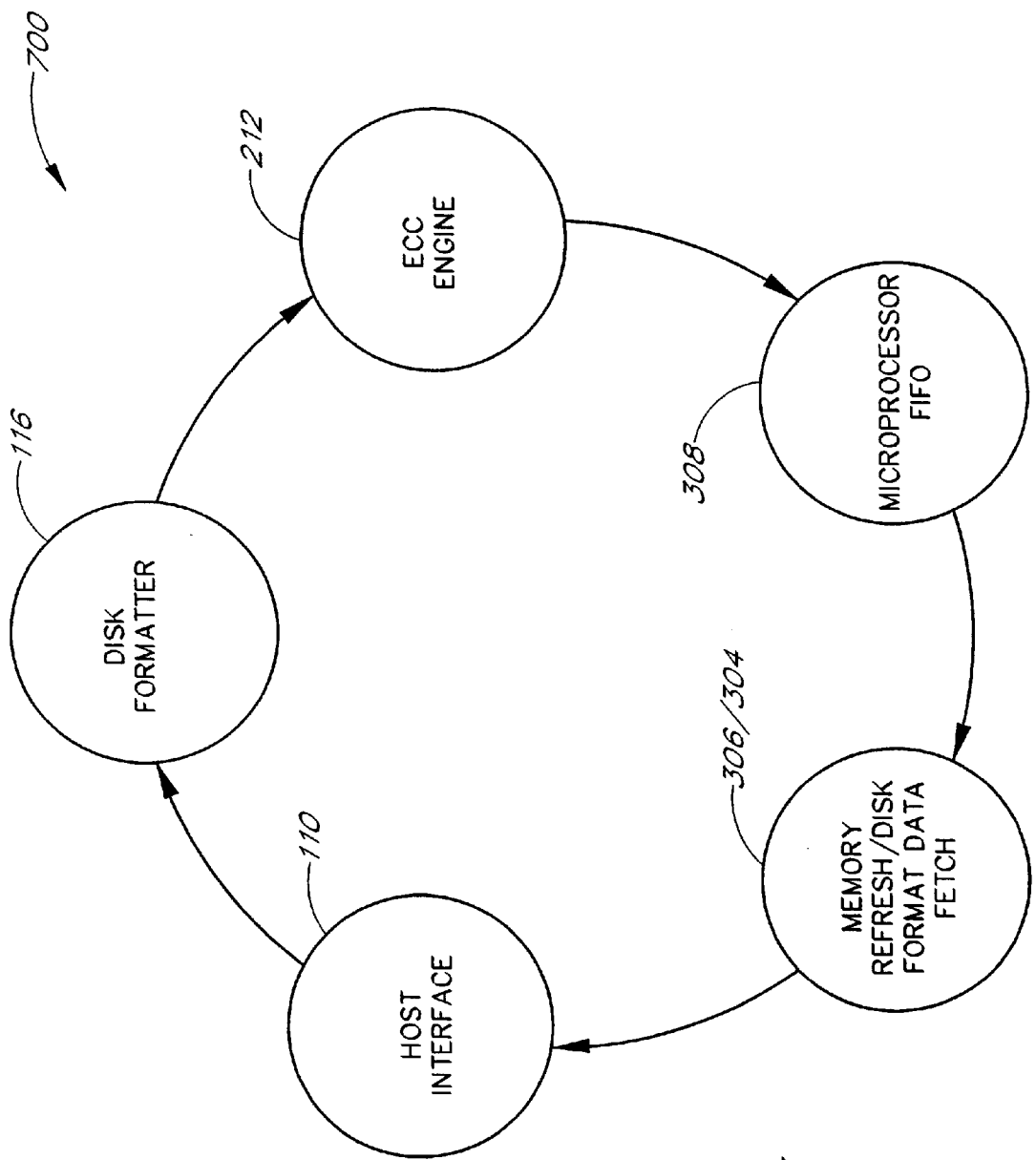
FIG. 7 illustrates one embodiment of an arbitration sequence.

FIG. 7 illustrates one embodiment of an access cycle 700. During an access cycle, the arbiter 402 (FIG. 4) checks each unit for access requests in a predetermined, repeating order. If a unit has not raised its REQ line to the arbiter 402, the arbiter 402 then checks the next unit's REQ line. The arbiter 402 continues around the access cycle until it finds a unit requesting buffer memory access. Note that memory refresh unit 306 and disk format data fetch unit 304 compete for the same access cycle slot. In a given access cycle, the arbiter may only grant access to one of the memory refresh unit 306 or the disk format data fetch unit 304. If both units 304/306 have requested access in the same cycle, the arbiter 402 gives priority to the memory refresh unit 306 as the buffer memory needs to be refreshed to avoid losing its contents; the disk format data fetch unit 304 then waits until the next access cycle to gain access.

FIGS. 8 and 8A–8D show a detailed flowchart 800 of one embodiment of a single access cycle of the arbitration process. In one embodiment, the arbitration process is controlled using an arbiter state machine. Because the arbitration process runs in a cycle, the choice of a start location is not critical. For the purposes of illustration, however, a start state 802 is shown. The first portion of the arbitration process 804–814 is directed to disk formatter access. At state 804, the arbiter 402 checks whether the disk formatter 116 is requesting buffer memory access by checking the disk formatter REQ line. If the disk formatter 116 is requesting access, the arbiter 402 grants access, at state 806, by raising the disk formatter's ACK line. Proceeding to state 808, the arbiter 402 reads the disk formatter arbitration limit from the corresponding arbitration limit register 410 and loads (sets) the limit into the arbitration limit counter 406. The arbitration limit counter 406 is decremented (counts down by one) during each HDC clock cycle. Next, at states 810, 812, the arbiter 402 repeatedly checks whether the disk formatter 116 arbitration limit has been exceeded (for example, if the arbitration limit counter 406 value has reached zero) and whether the disk formatter's request line REQ is still active. If the disk formatter 116 arbitration limit has been exceeded or if the disk formatter 116 request line REQ is inactive, at stage 814 the arbiter 402 deasserts the disk formatter's acknowledge ACK line. If, at state 804 mentioned above, the disk formatter 116 is not requesting access, the arbiter proceeds directly from state 804 to state 816.

Before proceeding with the rest of the arbitration process, at state 816 the arbiter 402 loads the global arbitration limit from the global arbitration limit register 418 into the global arbitration limit counter 408. The global arbitration limit counter 408 is decremented during each clock cycle of the remainder of the access cycle. Thus, the global arbitration limit is decremented while the ECC engine 212, the microprocessor FIFO 308, the disk format data fetch/memory refresh units 304/306 and the bus interface unit 110 are accessing the buffer memory 118. Once the global arbitration limit counter 408 reaches zero, a new access cycle begins and access is again offered to the disk formatter 116.

The global arbitration limit serves two purposes. First, the global arbitration limit limits the time available to all units other than the disk formatter 116. Second, the global arbitration limit serves, in effect, as the arbitration limit for the host interface unit 110. Each of the ECC engine 212, the microprocessor FIFO 308, and the disk format data fetch/memory refresh units 304/306 has its own arbitration limit. While each of these units are accessing the buffer memory 118, the arbitration limit counter 406 counts down from the corresponding arbitration limits. Further, while each of these units are accessing the buffer memory 118, the global arbitration limit counter 408 counts down from the global arbitration limit to determine the time that will eventually be offered to the host interface unit 110. Once the ECC engine 212, the microprocessor FIFO 308, and the disk format data fetch/memory refresh units 304/306 have completed their accesses, the host interface unit 110 is given access for the time remaining in the global arbitration limit counter 408.

Once the global arbitration limit counter 408 has been loaded, the arbiter 402 proceeds to state 818 (FIG. 8B) to determine if the ECC engine 212 is requesting access by checking the ECC engine REQ line. If the ECC engine 212 is requesting access, the arbiter proceeds to state 820 and grants access by asserting the ECC engine's ACK line. At this point, the arbiter 402 reads the ECC engine arbitration limit from the corresponding arbitration limit register 412, and proceeding to state 822, sets the arbitration limit counter 406. The arbitration limit counter 406 is decremented each clock cycle during the ECC engine access time period. Note that the global arbitration limit counter 408 is also decremented during this time. Next, the arbiter 402 at states 824, 826 repeatedly checks whether the ECC arbitration limit has been exceeded (for example, if the arbitration limit counter 406 value has reached zero) and whether the ECC engine's request line REQ is still raised. If the ECC arbitration limit has been exceeded or if the ECC engine's request line REQ is inactive, the arbiter 402 deasserts the ECC engine's ACK line at state 828. If, at state 818, the ECC engine 212 is not requesting access, the arbiter 402 proceeds directly to state 830.

Once the arbiter 402 has completed the ECC engine portion of the access cycle, the arbiter 402 proceeds to offer access to the microprocessor FIFO 308 at states 830–840 in a manner similar to that described above with respect to the ECC engine access. As with the ECC engine 212, while access is granted to the microprocessor FIFO 308, both the arbitration limit counter 406 and global arbitration limit counter 408 are decremented each clock cycle. Once the arbiter 402 has completed the microprocessor FIFO portion of the access cycle, the arbiter 402 proceeds to state 842.

Figure 8B:
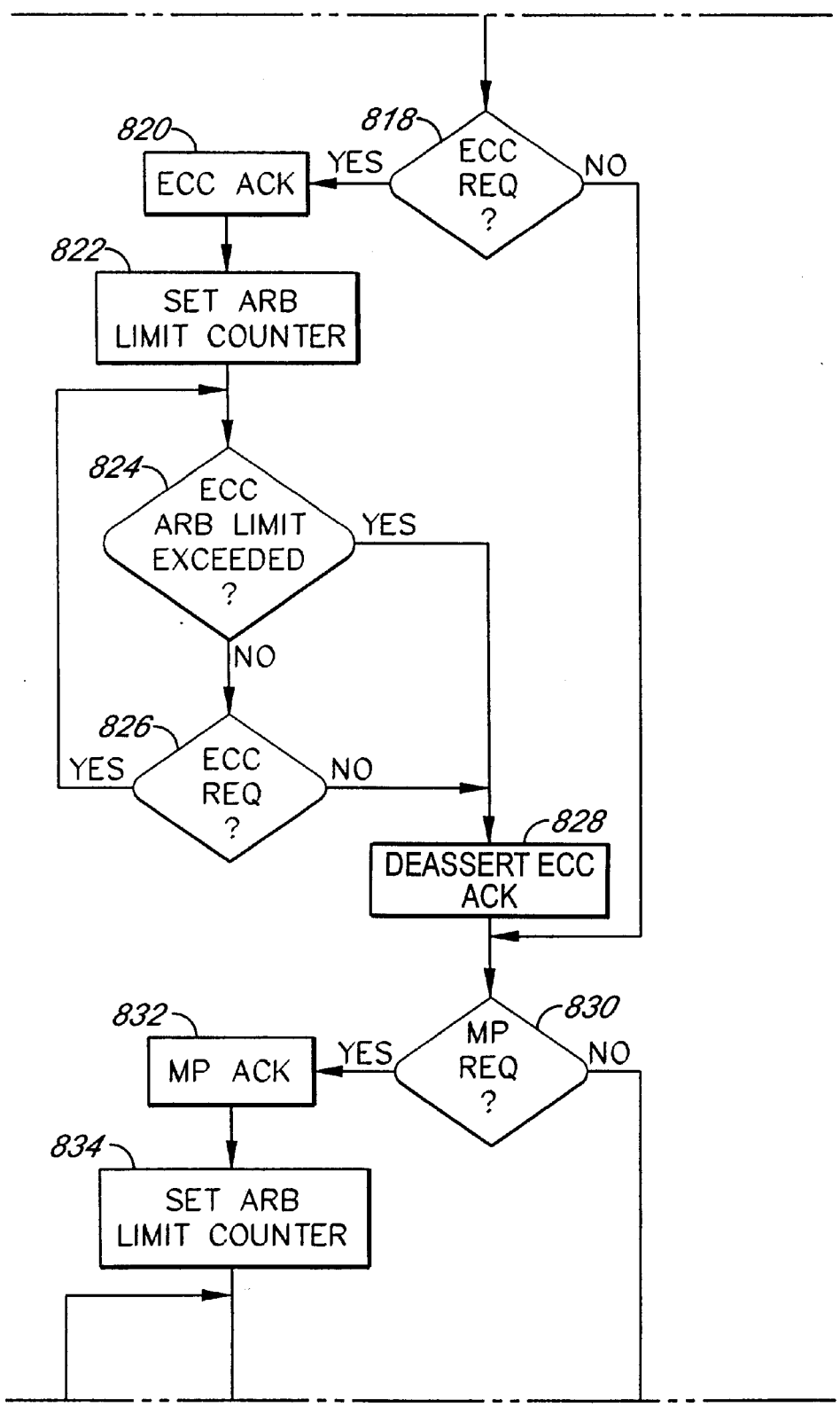
Figure 8C:
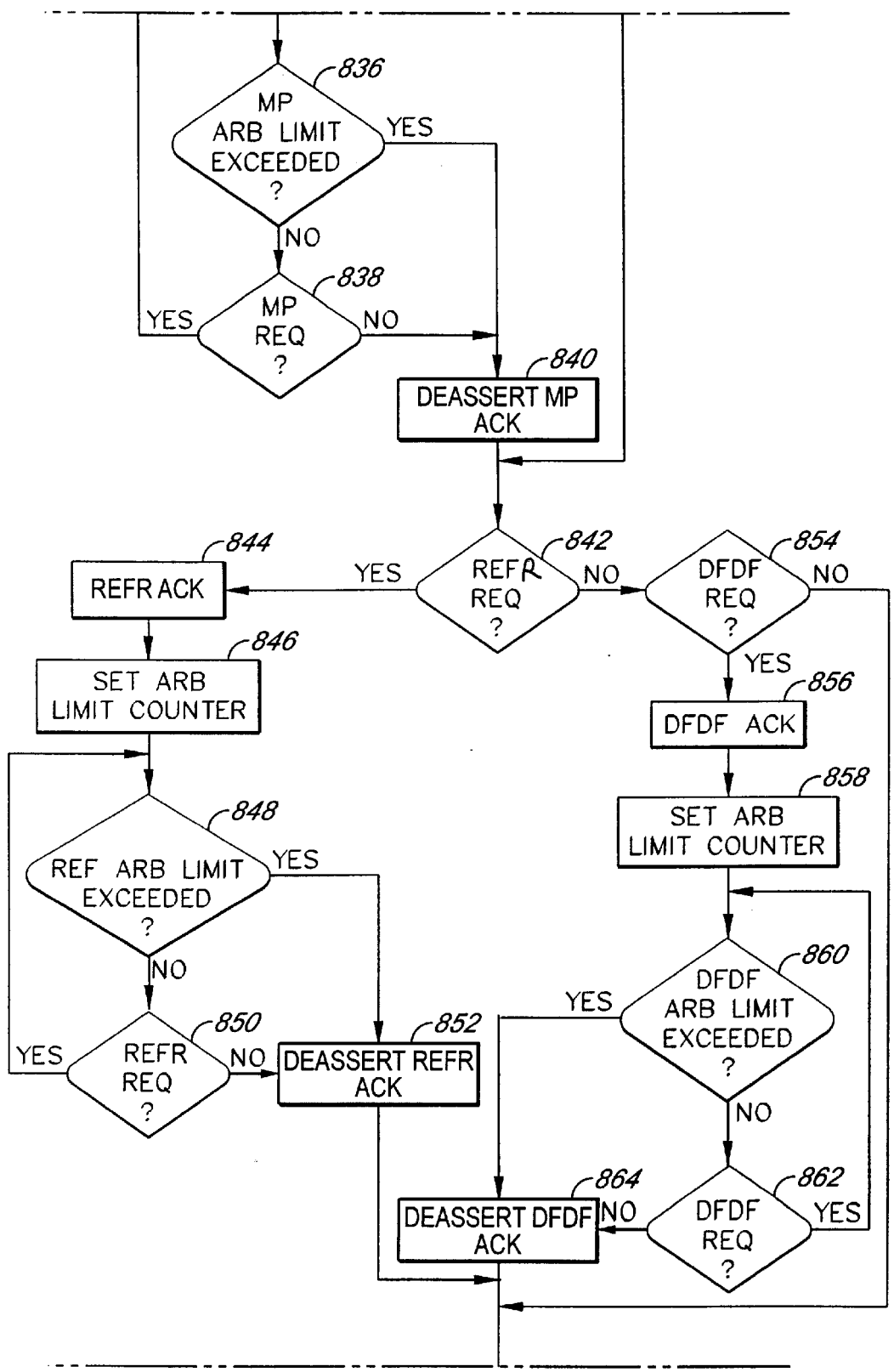
Figure 8D:
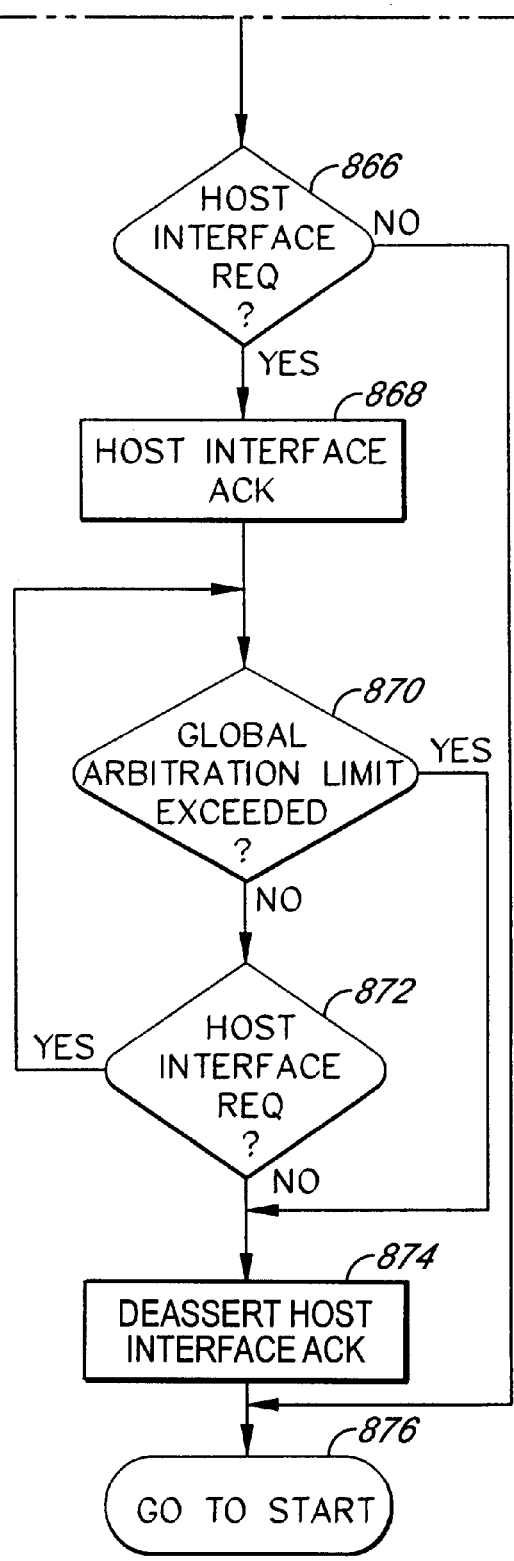

In the present embodiment, the arbiter 402 grants access to only one of the memory refresh unit 306 and the disk format data fetch unit 304 in a single access cycle. Thus, the flowchart branches at state 842 to accommodate this feature. A buffer memory refresh unit request takes priority over a disk format data fetch unit request. Therefore, the arbiter 402 first determines whether the refresh unit 306 is requesting access. If the refresh unit 306 is requesting access, the arbiter 402 follows a sequence 844–852 similar to that described above for the previous units. Of course, in this case the arbitration limit counter 406 is loaded with the refresh arbitration limit. If the refresh unit 306 is not requesting access, the arbiter 402 proceeds to state 854 and determines whether the disk format data fetch (DFDF) unit 304 is requesting access. If so, then the arbiter 402 follows a sequence 856–864 similar to the sequence for the refresh unit 306. If neither the disk format data fetch unit 304 nor the refresh unit 306 request access, the arbiter 402 proceeds directly from state 854 to state 866 as shown in FIG. 8D. At this point, the arbiter 402 offers access to the host interface 110.

In the present embodiment, the access duration of the host interface 110 is limited only by the global arbitration limit. As previously discussed, the global arbitration limit counter 406 is reset after access is offered to the disk formatter 116 and before access is offered to the ECC engine 212 and is then continually decremented while the units previous to the host interface 110 access the buffer memory 118. The host interface 110 is allowed access for the remainder of the global arbitration limit not used by the previous units. Note that the amount of time during which the disk formatter 116 accesses the buffer memory 28 does not affect the global arbitration limit counter 408 or the amount of time allocated to the host interface 110. This is because the global arbitration limit counter 408 is set only after the disk formatter 116 has had its turn during the access cycle. Thus, the host interface is flexibly offered an access time ranging from a predetermined minimum to a maximum as large as the global arbitration limit in a continuous block of time.

To allocate access to the host interface 110, at state 866, the arbiter first checks whether the host interface 110 is requesting access. If so, at state 868, the arbiter asserts host interface ACK line, thereby granting access to the buffer memory 118. The global arbitration limit counter 408 continues to be decremented while the host interface unit 110 is granted access. In the present embodiment, the global arbitration limit is sufficiently large to accommodate the arbitration limits of the previous units and still have at least some remaining time for the host interface unit. Next, at states 870, 872 the arbiter 402 repeatedly checks to see whether the global arbitration limit has been exceeded [for example, if the global arbitration limit counter 408 value has reached zero] and whether the host interface unit 110 is still requesting access. If the global arbitration limit has been exceed [i.e. global arbitration counter 408 value has reached zero], or if the host interface unit 110 drops its REQ line, the arbiter 402 deasserts the host interface's ACK line at step 874. If, at state 866, the host interface 110 is not requesting access, the arbiter 402 proceeds from state 866 to state 876. At this point the arbiter 402 has completed one access cycle and returns to the start state 802 of the flowchart 800.

In another embodiment of the present invention, the host interface unit's arbitration limit can be determined by an additive rather than a subtractive method. In this case, the global arbitration limit counter 408 would be initialized with a minimum arbitration limit for the host interface 110. Upon the release of access by any of the ECC engine 212, the microprocessor FIFO 308, the memory refresh unit 306 or the disk format data fetch unit 304, the value remaining in the arbitration limit counter 406 would be added to the global arbitration limit counter 408. The global arbitration limit counter 408 would then be decremented only while the host interface 110 is accessing the buffer memory 118. This process would yield the same result as the technique already described in detail above. In another embodiment, unused access times of earlier accessing units could be allocated to any subsequent unit. In still another embodiment, unused access times of earlier accessing units could be allocated to a particular subsequent unit other than the last accessing unit.

Exemplary Timing Scenarios

Figure 9:
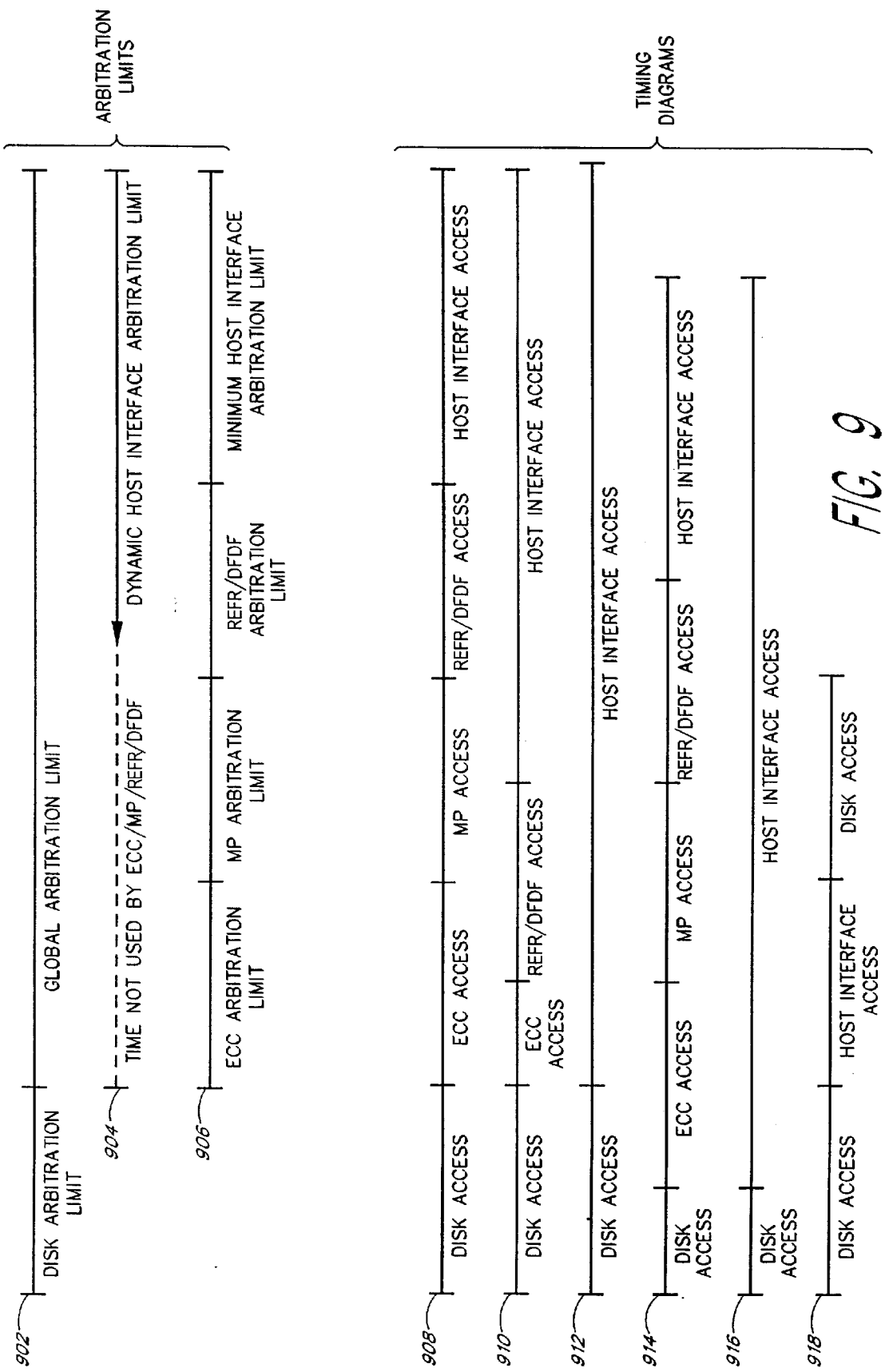
FIG. 9 shows a time line of the arbitration limits and some exemplary access timing diagrams.

FIG. 9 shows several exemplary arbitration limits and associated timing diagrams illustrating the arbiter operation. As mentioned above in the illustrated embodiment, an arbitration limit denotes the number of HDC clock cycles of each access cycle available to a corresponding unit during which the unit can access the buffer memory 118. With regard to the illustrated time lines 902–918, time begins towards the left side of the figure. The first time line 902 illustrates that at a top level, the arbitration process can be divided into two parts. The first part consists of the time allocated to the disk formatter 116, the disk arbitration limit. The second part consists of the time allocated to all of the other units, the global arbitration limit. The second time line 904 illustrates that the time available to the host interface 110, represented by the dynamic host interface arbitration limit, is the time represented by the global arbitration limit, diminished by the time granted to the ECC engine 212, microprocessor FIFO 308, and refresh/data fetch 306/304 units. Time line 906 illustrates that in one embodiment, the combined ECC arbitration limit, the microprocessor arbitration limit, and the refresh/data format data fetch (DFDF) arbitration limits are less than the global arbitration limit, thereby ensuring a minimum amount of time, the minimum host interface arbitration limit, is allocated to the host interface unit 110. Thus, even if the ECC 212, microprocessor 308 and the refresh/data fetch 304/306 units use all of their available access time, there will still be time remaining for the host interface 110 to access the buffer memory 118.

FIG. 9 illustrates timing diagrams for exemplary buffer memory arbitration sequences 908–918. In each diagram, one complete access cycle is shown, illustrating how the access cycle time can vary. The first exemplary arbitration sequence 908 shows the relative access time allocated to each unit when all units are requesting their maximum access time. In this case, the total access cycle time is at its maximum. In the next sequence 910, the ECC engine 212 deasserts its REQ line and ceases access about halfway through the allocated arbitration time shown in 906. In this example, the microprocessor FIFO 308 does not request access at all, but the host interface 110 requests, and is granted all of the remaining available time. In the next sequence 912, the ECC engine 212, refresh/data fetch units 304/306 and microprocessor 308 do not request buffer access. Thus, the complete global arbitration limit is made available to the host interface 110. In this sequence, both the disk formatter 116 and the host interface 110 use all of the time available to each.

In the next sequence 914, the disk formatter 116 releases its REQ line and only uses about half of its available time. In this sequence, the ECC engine 212, refresh/data fetch units 304/306, and the host interface 110 use all of their available access time. Because the disk formatter 116 relinquishes its access early, the complete access cycle time is less than in the previous sequences. The sequence 916 is similar to the sequence 914, except that the ECC 212, microprocessor 308 and refresh/data fetch 304/306 units do not request access. However, the host interface 110 requests maximum access in this case and uses the time given up by the other units. The last sequence 918 depicts a situation where the disk formatter 116 requests its full access time, the ECC 212, microprocessor 308 or refresh/data fetch 304/306 units do not request access, and the host interface 110 only requests a fraction of its available access time. In this case, because the global arbitration limit is never reached, the total access cycle time is substantially less than the maximum possible access cycle time.

Exemplary Arbitration Limit Calculations

Arbitration limits may be based on several factors including the following: the disk formatter FIFO size, the width of the buffer memory data bus, the hard disk data read/write rate, the clock speed of the HDC core 102, the time delay before requested data is read from the buffer memory 118 and the time it takes for the arbiter 402 to perform its operations, among others. These factors are typically constant and can be determined at the time of design and manufacture of the hard disk unit. The arbitration limits can be stored in non-volatile memory, or alternatively, these factors can be determined dynamically, during system operation.

In one embodiment of the present invention, the global arbitration limit is set to optimize the utilization of the hard disk 114. This is accomplished by ensuring that the disk formatter FIFO 312 is never left empty or full. The global arbitration limit defines the number of clock cycles between the time the disk formatter 116 gives up access to the buffer memory 118 on a previous cycle and the time that data again arrives at the FIFO 312 from the buffer memory 118 on a subsequent cycle. As long as there is data in the FIFO 312 on a disk write and as long as the FIFO 312 is not full on a disk read, the hard disk 114 will be optimally utilized.

Referring back to FIG. 5, during a disk write operation, data 502 is transferred from the buffer memory 118 to the disk formatter FIFO 312. When the disk formatter 116 is not accessing the buffer memory 118, the disk formatter FIFO 312 is continually emptied, with data being written to the hard disk 114 at the disk data rate. The disk data rate is the rate at which data can be written to or read from the hard disk 114. In one embodiment, the time it takes to empty a full disk formatter FIFO 312 can thus be defined as:

Time to empty=(FIFO size)/(disk data rate)

This time can be multiplied by the clock frequency to yield the time in clock cycles.

Clock cycles to empty=(clockfrequency)*(FIFO size)/(disk data rate)

By setting the global arbitration limit to approximately the number of clock cycles it takes for the hard disk 114 to empty a full disk formatter FIFO 312, the disk formatter 116 will be able to begin refilling the FIFO 312 just as it becomes empty. Thus, disk utilization is optimized.

In setting the global arbitration limit, some additional considerations may be taken into account. First, the arbiter 402 takes a finite number of clock cycles, called the arbitration delay, in order to grant access to a unit. Second, it takes a finite number of clock cycles, called the setup time, in order to set up the buffer memory 118 to begin transferring data. Third, it takes a finite number of clock cycles, called the read delay, to transfer data from the buffer memory 118 to the disk formatter FIFO 312. Thus, the number of "clock cycles to empty" is decreased by the arbitration delay, the setup time and the read delay, so that data from the buffer memory 118 arrives at the disk formatter FIFO 312 just as the FIFO 312 becomes empty. With these adjustments in one embodiment, the global arbitration limit is calculated as follows:

Global arbitration limit=(clockfrequency)*(FIFO size)/(disk data rate)−(arbitration delay)−(setup delay)−(read delay)

Although this global arbitration limit is based on the timing of a disk write, the timing of a disk read is analogous and yields a similar result.

The same adjustments made to the global arbitration limit are added, instead of subtracted, to the disk formatter arbitration limit. In essence, the cycles taken from the global arbitration limit are given to the disk formatter arbitration limit to maximize disk formatter utilization. However, before making the adjustments to the disk formatter arbitration limit, a base arbitration limit is formulated.

In calculating the disk formatter arbitration limit, the fact that the disk formatter FIFO 312 is being both emptied and filled simultaneously needs to be taken into consideration. In the preferred embodiment, when the disk formatter 116 has access to and is transferring data from the buffer memory 118 to the disk formatter FIFO 312, the disk formatter 116 is simultaneously emptying the FIFO 312 to the hard disk 114. When the disk formatter FIFO 312 is being simultaneously filled and emptied, the net rate at which it is being filled is the difference in the rates at which data is being placed in the FIFO 312 and at which data is being removed from the FIFO 312. The rate at which the data is placed in the FIFO 312, called the buffer data rate, is equal to the HDC's bus width times the clock frequency. With this, the fill rate can be expressed as follows:

Fill rate=(bus width)*(clockfrequency)−(disk data rate)

The disk formatter FIFO size is divided by the fill rate to determine the time to fill the disk formatter FIFO 312. This result is multiplied by the clock frequency to yield the number of clock cycles to fill the disk formatter FIFO 312:

Clock cycles to fill=(FIFO size)*(clock frequency)/((bus width)*(clock frequency)−(disk data rate))

As mentioned above in the calculations of the number of cycles to fill the disk formatter FIFO 312, the arbitration, the setup and the delay times are taken into account. As the FIFO 312 is being filled, however, there is a chance that a page boundary in the buffer memory 118 may be crossed. When a page boundary is crossed, another setup delay is incurred, and so a second setup delay is included in the calculation. The resulting disk formatter arbitration limit is thus increased by the additional overhead time of the arbitration delay, twice the setup delay, and the read delay:

Disk formatter arbitration limit=(FIFO size)*(clock frequency)/((bus width)*(clock frequency)−(disk data rate))+(arbitration delay)+2*(setup delay)+(read delay)

With the disk formatter and global arbitration limits set as described above, the disk formatter 116 and hard disk 114 achieve optimal utilization. The arbitration limits of the other units within the HDC 102 are constrained by the global arbitration limit. The memory refresh/disk format data fetch units 304/306 and the ECC engine 212 typically have predictable buffer utilization characteristics. Thus, arbitration limits can be easily selected in accordance with those characteristics. The microprocessor FIFO's arbitration limit accommodates a reasonable expectation of usage. Lastly, the host bus interface usage is fairly unpredictable so the bus interface unit 110 is allocated the remaining access time.

In another embodiment of the present invention, two or more units are allocated access time outside the scope of the global arbitration limit. In still another embodiment, no units are allocated access time outside the scope of the global arbitration limit. Rather, all of the units are granted access within the global arbitration limit and thus the global arbitration limit alone defines the maximum access cycle time. In still other embodiments, the number of units limited under the global arbitration limit can be varied. Optionally, additional global arbitration limits can be added that operate concurrently or sequentially. Other embodiments are contemplated in which additional units may access the buffer memory 118 in a manner similar to the disk formatter 116, outside of the global arbitration limit.

While certain exemplary preferred embodiments have been described and shown in the accompanying drawings, it is to be understood that such embodiments are merely illustrative of and not restrictive of the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A method for providing access to a buffer memory of a hard disk controller comprising the acts of:
   allocating a first amount of time to an error correction unit to access said buffer memory;
   allocating a second amount of time to a host interface unit to access said buffer memory;
   dynamically monitoring the first and second amount of time;
   accessing said buffer memory using said error correction unit for a first duration, said first duration being no greater than said first amount of time;
   adjusting said second amount of time by an amount related to the difference between said first amount of time and said first duration; and
   accessing said buffer memory using said host interface unit for a second duration, said second duration being no greater than said second amount of time.

2. The method as defined in claim 1, further comprising the acts of:
   allocating a third amount of time to a disk formatter unit to access said buffer memory;
   granting access to said buffer memory to said disk formatter unit; and
   accessing said buffer memory using said disk formatter unit for a third duration, said third duration being no greater than said third amount of time, wherein any unused portion of said third amount of time is not allocated to said host interface unit.

3. The method as defined in claim 2, wherein the disk formatter unit is again granted buffer memory access within a predetermined fourth amount of time after the end of said third duration.

4. The method as defined in claim 1, wherein access to said buffer memory is provided during a repeating access cycle during which the error correction unit, the host interface unit or the disk formatter unit does not access said buffer memory more than once.

5. A method for providing access to a shared controller resource of a mass storage device controller comprising the acts of:
   allocating a first portion of a first access cycle during which access to said shared controller resource is arbitrated, as a first continuous block of access time to a first accessing unit;
   dynamically monitoring the block of access time for the first accessing unit to access said shared controller resource;
   using said first accessing unit to access said shared controller resource for an amount of said first continues block of access time;
   allocating a second portion of said first access cycle and an amount of said first continuous block of access time unused by said first accessing unit as a second continuous block of access time to a second accessing unit to access said shared controller resource;
   dynamically monitoring the second continuous block of access time used by the second accessing unit; and
   using said second accessing unit to access said shared controller resource for an amount of said second continues block of access time.

6. The method as defined in claim 5, further comprising the acts of:
   allocating a third portion of said first access cycle as a third continuous block of access time to a third accessing unit to access said shared controller resource;
   granting access to said shared controller resource to said third accessing unit during said first access cycle to access said shared controller resource for an amount of said third continuos block of access time;
   using said third accessing unit during said first access cycle to access said shared controller resource for an amount of said third continuos block of access time;
   releasing access of said shared controller resource by said third accessing unit; and
   granting access to said shared controller resource to said third accessing unit during a second access cycle, wherein the second access cycle grant is performed within a predetermined amount of time after the releasing of access to said shared controller by said third accessing unit.

7. The method as defined in claim 6, further comprising the acts of:
   specifying a duration associated with said first access cycle; and
   reducing the duration of at least one iteration of said first access cycle by an amount related to an unused amount of said second continuous block of access time.

8. The method as defined in claim 6, wherein said shared controller resource is a buffer memory.

9. The method as defined in claim 6, wherein said first accessing unit is a processor and said second accessing unit is a host interface circuit.

10. A method of varying a duration of an access cycle of a mass storage device controller shared controller resource, wherein the access to the shared controller resource is arbitrated, said method comprising the acts of:
    allocating a first amount of time to a first accessing unit to access said shared controller resource;
    accessing said shared controller resource using said first accessing unit for a first duration, said first duration being no greater than said first amount of time;
    dynamically monitoring the first amount of time; and
    allocating a second amount of time and an unused amount of said first amount of time to a second accessing unit to access said shared controller resource.

11. The method as defined in claim 10, further comprising the acts of:
    allocating a third amount of time to a third accessing unit to access said shared controller resource;
    accessing said shared controller resource using said third unit for a third duration, said third duration being no greater than said third amount of time; and
    reducing a duration of an access cycle during which access to said shared controller resource is arbitrated by an amount related to an unused amount of said third amount of time.

12. The method as defined in claim 10, wherein said shared controller resource is a controller memory.

13. The method as defined in claim 11, wherein said first accessing unit is a memory refresh circuit, said second accessing unit is a host interface circuit, and said third accessing unit is a disk formatter circuit.

14. A method for providing access to a shared memory of a disk controller, said method comprising the acts of:
    allocating an amount of time as an available memory access time to each of at least two units to access said shared memory;

dynamically monitoring the amount of time available to each of the at least two units;

accessing said shared memory of said disk controller using said at least two units, wherein any unused time allocated to a first of said at least two units is reallocated to a second of said at least two units.

15. The method as defined in claim 14, wherein said at least two units include at least a data fetch circuit and a host interface circuit.

16. A method for providing access to a shared controller resource of a mass storage device controller comprising the acts of:

allocating a first amount of time to a first accessing unit to access said shared controller resource;

allocating a second amount of time to a second accessing unit to access said shared controller resource;

accessing said shared controller resource using said first accessing unit for a first duration, said first duration being no greater than said first amount of time;

dynamically monitoring the first and second amount of time;

adjusting said second amount of time by an amount related to the difference between said first amount of time and said first duration; and accessing said shared controller resource using said second accessing unit for a second duration, said second duration being no greater than the adjusted second amount of time.

17. A mass storage device controller circuit, including a shared memory, said controller circuit comprising:

an error correction circuit used to correct data read from a mass storage device, said error correction circuit associated with a first amount of time allocated to access said shared memory;

a host system interface circuit used to exchange data with a host system, said host system interface circuit associated with a second amount of time allocated to access the shared memory;

a storage device formatter circuit used to interface to said mass storage device, said storage device formatter circuit associated with a third amount of time allocated to access said shared memory;

a set of plural registers that store the allocated first, second and third amount of time;

an arbitration limit counter for dynamically monitoring the allocated first, second and third amount of time; and an arbiter circuit used to arbitrate access to said shared memory by at least said host system interface circuit, said error correction circuit, and said storage device formatter circuit, wherein said arbiter circuit is configured to grant said error correction circuit access to shared memory for a first duration, said first duration being no greater than said first amount of time, and to adjust said second amount of time by an amount related to the difference between said first amount of time and said first duration.

18. The mass storage device controller circuit as defined in claim 17, wherein said arbiter circuit is further configured to provide access to said shared memory during a repeating access cycle during which the error correction circuit, the host system interface circuit or the storage device formatter circuit do not access the shared memory more than once.

19. The mass storage device controller circuit as defined in claim 17, wherein said storage device formatter circuit is provided access to said shared memory within a predetermined time period after a previous access of said shared memory by said storage device formatter circuit.

20. The mass storage device controller circuit as defined in claim 17, wherein said arbiter is a state machine.

21. A computer system comprising:

a host system;

a host system interface circuit coupled to said host system, said host system interface circuit used to exchange data with said host system;

an error correction circuit used to correct erroneous data read from a mass storage device;

a storage device formatter circuit used to interface to said mass storage device;

an arbiter circuit used to arbitrate access to a shared buffer memory by at least said host system interface circuit, said error correction circuit, and said storage device formatter circuit, wherein said arbiter circuit is configured to allocate a first amount of time to said error correction circuit to access said shared buffer memory, to allocate a second amount of time to said host interface circuit to access said shared buffer memory, and to allocate a third amount of time to said storage device formatter circuit to access said shared buffer memory, and wherein said arbiter circuit is further configured to provide said error correction circuit access to said shared buffer memory for a first duration, said first duration being no greater than said first amount of time, and to adjust said second amount of time by an amount related to the difference between said first amount of time and said first duration;

a set of plural registers that store the allocated first, second and third amount of time; and an arbitration limit counter for dynamically monitoring the allocated first, second and third amount of time.

22. The computer system as defined in claim 21, wherein said arbiter circuit is further configured to provide access to said shared buffer memory during a repeating access cycle during which the error correction circuit, the host interface circuit or the storage device formatter circuit do not access the shared buffer memory more than once.

23. A mass storage device controller comprising:

a means for buffering data;

a means for exchanging data with a host system, said means for exchanging data with a host system coupled to said means for buffering data;

a means for processing data, said means for processing data coupled to said means for buffering data;

a means for exchanging data with said mass storage device, said means for exchanging data with said mass storage device coupled to said means for buffering data;

a means for arbitrating access to said means for buffering data by at least said means for exchanging data with a host system, said means for processing data, and said means for exchanging data with a mass storage device, wherein said means for arbitrating access is configured to allocate a first amount of time to said means for processing data to access said means for buffering data, to allocate a second amount of time to said means for exchanging data with a host system to access said means for buffering data, and to allocate a third amount of time to said means for exchanging data with a mass storage device to access said means for buffering data, wherein said means for arbitrating is further configured to provide said means for processing data access for a first duration, said first duration being no greater than said first amount of time, and to adjust said second amount of time by an amount related to the difference between said first amount of time and said first duration;

a means for storing the allocated first, second and third amount of time; and a means for dynamically monitoring the allocated first, second and third amount of time.

24. The mass storage device controller as defined in claim 23, wherein said means for arbitrating access is further configured to provide access to said means for buffering data during a repeating access cycle during which the means for exchanging data or the means for processing data do not access said means for buffering data more than once.

25. A method for providing access to a shared controller resource of a mass storage device controller comprising the acts of:

allocating a first amount of time as a first available access time to a first accessing unit to access said shared controller;

allocating a second amount of time as a second available access time to a second accessing unit to access said shared controller, said second available access time may include at least said first available access time;

accessing said shared controller resource using said first accessing unit for a first duration, said first duration being no greater than said first available access time;

dynamically monitoring the first and second amount of time;

decreasing said second available access time by said first duration; and accessing said shared controller resource using said second accessing unit for a second duration, the second duration being no greater than said decreased second available access time.

26. The method as defined in claim 25, further comprising the acts of:

allocating a third amount of time as a third available access time to a third accessing unit to access said shared controller, said third amount of time not included in said second amount of time; and accessing said shared controller resource using said third accessing unit for a third duration, said third duration being no greater than said third available access time.

27. The method as defined in claim 25, wherein access to the shared controller resource is provided during a repeating access cycle during which the first accessing unit, the second accessing unit or the third accessing unit do not access the shared controller resource more than once.

28. The method as defined in claim 27, wherein said access cycle has a maximum duration approximately equal to the sum of said second amount of time and said third amount of time.

29. The method as defined in claim 26, wherein said third accessing unit has a data buffer through which data passes as it moves between said shared controller resource and said third accessing unit.

30. The method as defined in claim 29, wherein said third amount of time is determined at least in part by the size of said data buffer, and by the difference between the rate at which data is transferred between said shared controller resource and said data buffer and the rate at which data is processed by said third accessing unit.

31. The method as defined in claim 29, wherein said second amount of time is determined at least in part by the size of said data buffer and by the rate at which data is processed by said third accessing unit.

32. The method as defined in claim 29, wherein said second amount of time and said third amount of time are determined at least in part by taking into account the amount of time needed to begin a transfer of data between said shared controller resource and said data buffer upon a release of access to said shared controller resource by one of the accessing unit.

33. The method as defined in claim 26, wherein said second unit is a host interface unit and said third unit is a storage device formatter unit.

34. A disk controller circuit, including a memory accessed by a plurality of disk controller circuits, said disk controller circuit comprising:

a first controller circuit with a corresponding first allocated amount of time for accessing said memory;

a second controller circuit with a corresponding second allocated amount of time for accessing said memory;

a set of plural registers that store the allocated first and second amount of time for accessing said memory;

an arbitration limit counter for dynamically monitoring the allocated first and second amount of time for accessing said memory; and an arbiter circuit which measures a quantity associated with an actual amount of time by said first controller circuit and adjusts said second allocated amount of time by an amount related to the difference between said first allocated access duration and said actual access duration by said first controller circuit.

* * * * *

UNITED STATES PATENT AND TRADEMARK OFFICE
CERTIFICATE OF CORRECTION

PATENT NO. : 6,530,000 B1
APPLICATION NO. : 09/275629
DATED : March 4, 2003
INVENTOR(S) : Leon A. Krantz et al.

It is certified that error appears in the above-identified patent and that said Letters Patent is hereby corrected as shown below:

| | |
|---|---|
| Column 3, Line 58 | Delete "." after "host" |
| Column 4, Line 1 | Delete "." after "is" |
| Column 6, Line 35 | Delete "1 10" and insert -- 110 -- |
| Column 10, Line 5 | Delete "306/304" and insert -- 304/306 -- |
| Claim 5 Column 13, Line 55 | Delete "continues" and insert -- continuous -- |
| Claim 5 Column 13, Line 66 | Delete "continues" and insert -- continuous -- |
| Claim 6 Column 14, Line 9 | Delete "continuos" and insert -- continuous -- |
| Claim 6 Column 14, Line 12 | Delete "continuos" and insert -- continuous -- |

Signed and Sealed this

Tenth Day of June, 2008

JON W. DUDAS
*Director of the United States Patent and Trademark Office*